Patented July 20, 1954

2,684,353

UNITED STATES PATENT OFFICE 2,684,353

METHOD OF STABILIZING HALOGEN CONTAINING POLYMERIC SUBSTANCES AGAINST HEAT AND LIGHT WITH SALTS OF EPOXY FATTY ACIDS

Frank P. Greenspan and Ralph J. Gall, Buffalo, N. Y., assignors to Buffalo Electro-Chemical Company, Inc., Tonawanda, N. Y.

No Drawing. Application May 31, 1951, Serial No. 229,256

8 Claims. (Cl. 260—45.75)

This invention pertains to a method of stabilizing halogen containing high polymeric substances against the effects of heat and light.

Halogen containing polymeric substances, such as the commercially extremely important polyvinyl chloride and its copolymers, exhibit marked instability when exposed to heat and light. Heat and light, singly or together, cause halogen containing polymers to discolor to a high degree, and may also cause embrittlement and generally a loss of desired physical properties.

Discoloration due to the action of heat and light is very apt to occur in the course of forming and fabricating articles from polymers, such as polyvinyl chloride and its copolymers, where operating temperatures of 150° C. and more, frequently have to be employed. Severe service conditions of exposure to high temperature and strong light sources also cause discoloration. Such discoloration interferes with the production of the important clear films so widely used in packaging as it tends to change the color of colored articles in an unwanted manner. Thus, stabilization of the polymer against the effect of heat and light is of prime importance to prevent objectionable changes of the desirable physical properties of the polymer.

Although stabilization against the effects of heat and light is important in connection with halogen containing polymers generally, and their copolymers, the present invention will be particularly described in its application to the important member of the class, polyvinyl chloride without, however, being restricted thereto, as it may be generally applied to halogen containing polymers or copolymers as well as to halogenated high molecular weight hydrocarbons.

As the breakdown of polyvinyl chloride caused by heat and light involves liberation of hydrochloric acid, various types of hydrochloric acid acceptors have been used or suggested for use as heat and light stabilizers, designated in the trade as stabilizers.

Although inorganic basic compounds are known to react generally with hydrochloric acid, they have not been found satisfactory in commercial use as stabilizers. Many compounds of widely different chemical structure have been suggested or used for the purpose of stabilizing polyvinyl chloride and related compounds against the effects of heat and light.

One group of stabilizers found commercially acceptable comprises the metal salts of higher fatty acids, particularly the barium, strontium, cadmium and lead salts, to name the more important ones. Although generally satisfactory, they suffer from certain disadvantages. The lead salts, for example, cannot be used in the manufacture of clear films because they impart pronounced opaqueness to the polymer. Other metal-organic compounds, such as alkyl lead and alkyl tin compounds, have also been suggested as stabilizers but are used on a limited scale only, mainly because of cost considerations.

More recently, epoxy compounds, such as the compound obtained by condensing a bisphenol with epichlorohydrin, have been recommended as stabilizers, particularly for use in conjunction with metal-organic compounds, such as the cadmium salt of fatty acids. Used by themselves, the stabilizing effect of these epoxy compounds is unsatisfactory in spite of their ability to act as hydrochloric acid acceptors.

It is the main object of this invention to provide means to impart improved heat and light stability to halogen containing polymeric substances and particularly to polyvinyl chloride.

Other objects and advantages will appear in the following more detailed description of the principles of this invention.

We have found that improved heat and light stability is imparted to halogen containing polymeric substances and particularly to polyvinyl chloride, if small amounts of metal salts of epoxy acids are incorporated in the polymer.

Metal salts of epoxy acids represent a novel class of compounds, the preparation of which is fully described in our copending application Serial Number 229,255, filed on the 31st day of May 1951. These compounds are the polyvalent metal salts of straight or branched chain, substituted or unsubstituted aliphatic acids of 11 to 22 carbon atoms containing one or more epoxy rings in the chain. They possess a metallic constituent and an epoxy ring within the same molecule. It is thought that this particular unitary structure may be responsible for the very high stabilizing efficiency of such metal salts of epoxy acids which stabilizing efficiency is higher than that of formulations comprising a simple mixture of a metal-organic compound with an epoxy compound. Thus, a typical compound, cadmium epoxy stearate has, under comparable testing conditions, a substantially higher stabilizing efficiency than a simple mixture of cadmium stearate with an epoxy compound, such as exemplified by the epoxide resulting from condensing a bisphenol with epichlorohydrin.

Examples of metal salts of epoxy acids useful for the purposes of this invention comprise the magnesium, calcium, zinc, strontium, cadmium, barium, aluminum, thallium, zirconium, lead, tin, antimony, chromium, manganese, or cobalt compounds of the epoxy acids derived from oleic, elaidic, erucic, linoleic, linolenic, eleostearic, ricinoleic or dehydrated castor oil fatty acids or mixtures thereof, or the epoxy acids derived from oils containing unsaturated acids, such as cottonseed oil, soybean oil, peanut oil, menhaden oil, tall oil, tung oil, castor oil or tallow or mixtures thereof, i. e., the polyvalent metal salts of such epoxidized fatty acids.

Although the stabilizers of this invention exhibit certain differences in specific stabilizing efficiency, each one is more efficient than a simple mixture of separate molecular compounds as previously specifically illustrated.

Conditions prevailing in a given manufacturing operation, as well as the particular type of halogen containing polymer to be processed, will influence the choice of the stabilizer to be used. However, particularly the cadmium, barium and strontium salts of epoxy-acids are of high stabilizing efficiency under manifold conditions and thus approach in their behavior a general purpose stabilizer.

The stabilizers of this invention may be used singly or in combination. The latter procedure is particularly advantageous from an economic viewpoint. It permits one to obtain excellent stabilizing efficiency through the joint use of a relatively smaller amount of more expensive stabilizer of higher specific efficiency and a relatively larger amount of a less expensive stabilizer of lower specific efficiency. For example, excellent stabilizing effects are obtained by the joint use of a mixture of 25 parts of the more expensive cadmium epoxy stearate and 75 parts of the less expensive strontium epoxy stearate. This mixture will give at least the same stabilizing effects as the use of the more expensive cadmium epoxy stearate by itself, although the specific efficiency of this latter compound is somewhat higher than the specific efficiency of the strontium salt.

The following examples will serve to illustrate in greater detail the principle of this invention. In these examples the stabilizers were employed in amounts corresponding to 3 parts of stabilizer to every 100 parts of polyvinyl chloride. Amounts in this range will be generally satisfactory, although lesser amounts may impart satisfactory stability under mild operating conditions. Amounts substantially larger than 5 parts of stabilizer to every 100 parts of polyvinyl chloride will seldom be required and still larger amounts will not result in a further improvement.

EXAMPLE I

A plastisol resin formulation was prepared by compounding 100 parts of a polyvinyl chloride resin of the paste type with 65 parts of plasticizer (in this instance, dioctyl phthalate) and 3 parts of barium ricinoleate, an efficient commercial stabilizer. Samples were cast into aluminum molds to give disks of about 1 millimeter thickness and then subjected to a severe test for heat stability in presence of air by placing the samples in an oven maintained at 175° C. After 5 minutes, 15 minutes and 30 minutes, samples were withdrawn and their appearance observed and noted.

This set of samples involving the use of barium ricinoleate stabilizer served as a standard of comparison.

Another set of samples was prepared in exactly the same manner, but compounded without the use of any stabilizer, to serve as a blank.

Still other samples were prepared and tested in exactly the same manner, but instead of 3 parts of barium ricinoleate stabilizer, 3 parts of the following stabilizers were used in different sets of examples:

Cadmium epoxy stearate
Strontium epoxy stearate
Lead epoxy stearate
Cadmium salt of epoxidized acids of cotton-seed oil
Cadmium salt of epoxidized acids of soybean oil
Strontium salt of epoxidized acids of soybean oil
Barium salt of epoxidized acids of soybean oil For ready reference, the acids of the above vegetable oils are as follows: cotton-seed—linoleic acid, oleic acid, palmitic acid and lesser amounts of stearic acid, myristic acid and arachidic acid; soybean—linoleic acid, oleic acid, linolenic acid plus some saturated acids.

A comparison of the samples after exposure to a temperature of 175° C. in presence of air and for the times noted, gave the following results expressed in terms of—

E—equal to "standard discoloration."
B—better than standard, no discoloration or trace of discoloration only.

Table I

| Stabilizer | Exposure to 175° C. for— | | |
|---|---|---|---|
| | 5 minutes | 15 minutes | 30 minutes |
| Blank | Light Brown | Brown | Brown. |
| Barium ricinoleate standard. | No color | Straw color | Yellow. |
| Cadmium epoxy stearate. | E | B | B. |
| Strontium epoxy stearate. | E | B | E. |
| Lead epoxy stearate | E | B | B. |
| Cadmium salt of epoxidized acids of cotton-seed oil. | E | B | B. |
| Cadmium salt of epoxidized acids of soybean oil. | E | B | E. |
| Strontium salt of epoxidized acids of soybean oil. | E | B | B. |
| Barium salt of epoxidized acids of soybean oil. | E | B | B. |

EXAMPLE II

Another batch of a plasticized resin was prepared in the manner described in Example I and stabilized with 3 parts of barium ricinoleate to serve as standard of comparison. Another set of samples was prepared in exactly the same manner but compounded without any stabilizer to serve as a blank.

Still other samples were prepared in exactly the same manner but instead of 3 parts of barium ricinoleate stabilizer, the following combinations of stabilizers were used in such a manner as to introduce a total of 3 parts of combined stabilizer into the resin:

```
                                                              Parts
   {Cadmium epoxy stearate_____   25
A { and
   {Strontium salt of epoxidized acids of cotton-seed oil____   75
   {Cadmium epoxy stearate_____   25
B { and
   {Strontium epoxy stearate_____   75
   {Cadmium salt of epoxidized acids of cotton-seed oil_____   25
C { and
   {Strontium salt of epoxidized acids of cotton-seed oil____   75
   {Lead epoxy stearate_____   25
D { and
   {Strontium epoxy stearate_____   75
```

All samples were tested as in Example I. Their comparison after exposure to 175° C. in presence of air and for the times noted gave the following results expressed in the terms defined in Example I.

*Table II*

| Stabilizer | Exposure to 175° C. for— | | |
|---|---|---|---|
| | 5 minutes | 15 minutes | 30 minutes |
| Blank | Light Brown | Brown | Brown. |
| Barium ricinoleate | No color | Straw color | Yellow. |
| A | E | B | B. |
| B | E | B | B. |
| C | E | B | B. |
| D | E | B | B. |

EXAMPLE III

Another batch of plasticized resin was prepared in the manner described in Example I, but a combination of commercially available stabilizers was used, namely, 3 parts of a mixture of equal parts of an epoxide resulting from condensing a bisphenol with epichlorohydrin and of cadmium salt of a fatty acid. This sample served as a standard of comparison.

Another sample was prepared in exactly the same manner, but instead of using 3 parts of the above mixed commercial stabilizer, 3 parts of cadmium epoxy stearate were used.

Both samples were tested as in Example I. Their comparison, after exposure to 175° C. in presence of air and for the times noted, gave the following results expressed in the terms defined in Example I.

*Table III*

| Stabilizer | Exposure to 175° C. for— | | |
|---|---|---|---|
| | 5 minutes | 15 minutes | 30 minutes |
| Epoxide and cadmium salt of a fatty acid | No color | No color | Brown. |
| Cadmium epoxy stearate | E | E | B. |

The sample containing cadmium epoxystearate after 30 minutes of exposure shows only a light cream color.

EXAMPLE IV

Another resin formulation was prepared by compounding 500 parts of a polyvinyl chloride resin of the type known to the trade as "Geon Resin 101," with 250 parts of dioxtyl phthalate plasticizer. The batch was divided to give five equal samples, to each of which 3 parts of stabilizer were added as follows:

*Sample E.*—Strontium salt of fatty acid, commercial product.
*Sample F.*—Cadmium stearate, commercial product.
*Sample G.*—Cadmium stearate and strontium stearate combination in ratio 1:3.
*Sample H.*—Cadmium epoxy stearate.
*Sample I.*—Cadmium epoxy stearate and strontium epoxy stearate combination in ratio 1:3.

The fully compounded samples, after addition of the respective stabilizers, were then sheeted by working on a two roll mill at 132–143° C. for 7 minutes with the rolls of the mill set at 1/16 inch clearance. The sheets were then further milled for an additional 3 minutes at a roll setting of 1/4 inch. Thereafter the sheets were pressed between smooth platens for 2 minutes at 150–155° C. at 6000 lbs. per square inch pressure to give finished sheets of about 1 millimeter thickness. All samples were then subjected to the heat stability test described in Example I and compared after exposure to a temperature of 175° C. in presence of air and for the times noted. This test gave the following results, expressed in the terms defined in Example I.

*Table IV*

| Sample | Exposure to 175° C. for— | | | |
|---|---|---|---|---|
| | 5 minutes | 15 minutes | 30 minutes | 45 minutes |
| E | No color | Yellow | Amber | Brown. |
| F | do | do | do | Do. |
| G | do | Amber | do | Amber. |
| H | E | B | B | B. |
| I | E | B | B | B. |

Satisfactory heat stability of polyvinyl chloride is of particular importance in connection with the various forming and fabricating operations involved in the manufacture of finished articles. Satisfactory light stability, on the other hand, is of particular importance in connection with the serviceability of the finished article, although a sufficient degree of heat stability is also required.

Both stability requirements are met by the stabilizers of this invention, which not only impart improved heat stability to the polyvinyl chloride, but also improved light stability.

The heat stabilizing effects of the stabilizers of this invention have been illustrated by Examples 1 to 4. The following example will serve to illustrate the light stabilizing effects of these stabilizers.

EXAMPLE V

A resin formulation was prepared as in Example 4 by compounding 600 parts of polyvinyl chloride resin of the type known to the trade as "Geon Resin 101" with 300 parts of dioctyl phthalate plasticizer. The batch was divided to give six equal samples, to five of which three parts of stabilizer were added as follows:

*Sample J.*—Strontium salt of fatty acid, commercial product.
*Sample K.*—Cadmium stearate, commercial product.
*Sample L.*—Cadmium stearate and strontium stearate, combination in ratio 1:3.
*Sample M.*—Cadmium epoxy stearate.
*Sample N.*—Cadmium epoxy stearate and strontium epoxy stearate combination in ratio 1:3.
*Sample O.*—Was compounded without stabilizer to serve as a blank.

These cadmium and strontium compounds were chosen for comparison purposes, because typical commercially available dual purpose, that is, heat and light stabilizers, are frequently based on either strontium or cadmium compounds.

The fully compounded samples, after addition of the respective stabilizers, were then sheeted by working on a two roll mill at 132–143° C. for 7 minutes with the rolls of the mill set at 1/16 inch clearance. The sheets were then further milled for an additional 3 minutes at a roll setting of 1/4 inch. Thereafter the sheets were pressed between smooth platens for 2 minutes at 150–155° C. at 6000 lbs. per square inch pressure. All samples were then subjected to a light test, based on a modification of A. S. T. M. Method D–620–49, Standard Method of Test for Color-Fastness of Plastics to Light. The results of this test, again expressed in the terms defined in Example 1, are shown in the following table.

*Table V*

| Stabilizer | Exposed to Light for— | | |
|---|---|---|---|
| | 96 hours | 189 hours | 404 hours |
| J | Faint Amber | Faint Amber | Amber. |
| K | do | do | Brown. |
| L | Amber | Brown | Do. |
| M | B | B | B. |
| N | B | B | B. |
| O | Amber | Brown | Brown-Black. |

These examples show that the stabilizers of this invention are superior in comparison to commercially available stabilizers of relatively high efficiency, including commercially available combinations of epoxy compounds with metal-organic compounds. They are particularly suited for the severe requirements of milling operations, perform very well in casting operations and impart improved heat as well as light stability.

What is claimed is:

1. The method of imparting improved heat and light stability to a chlorine-containing vinyl polymer, which comprises incorporating in said composition a stabilizing amount of a polyvalent metal salt of an aliphatic acid selected from the group consisting of straight chain, branched chain and substituted aliphatic acids of 11 to 22 carbon atoms containing an epoxy ring in the chain.

2. The method of imparting improved heat and light stability to a chlorine-containing vinyl polymer, which comprises incorporating in said composition a stabilizing amount of a mixture of polyvalent metal salts of aliphatic acids selected from the group consisting of straight chain, branched chain and substituted aliphatic acids of 11 to 22 carbon atoms containing an epoxy ring in the chain.

3. A heat and light stabilized chlorine-containing polymeric substance containing a stabilizing amount of a polyvalent metal salt of an aliphatic acid selected from the group consisting of straight chain, branched chain and substituted aliphatic acids of 11 to 22 carbons atoms containing an epoxy ring in the chain.

4. A heat and light stabilized chlorine-containing polymeric substance containing a stabilizing amount of a mixture of polyvalent metal salts of aliphatic acids selected from the group consisting of straight chain, branched chain and substituted aliphatic acids of 11 to 22 carbon atoms containing an epoxy ring in the chain.

5. A heat and light stabilized chlorine-containing vinyl polymer containing a stabilizing amount of a polyvalent metal salt of an aliphatic acid selected from the group consisting of straight chain, branched chain and substituted aliphatic acids of 11 to 22 carbon atoms containing an epoxy ring in the chain.

6. A heat and light stabilized chlorine-containing vinyl polymer containing a stabilizing amount of a mixture of polyvalent metal salts of aliphatic acids selected from the group consisting of straight chain, branched chain and substituted aliphatic acids of 11 to 22 carbon atoms containing an epoxy ring in the chain.

7. A heat and light stabilized chlorine-containing vinyl polymer containing from 0.5% to 5% of polyvalent metal salts of aliphatic acids selected from the group consisting of straight chain, branched chain and substituted aliphatic acids of 11 to 22 carbon atoms containing an epoxy ring in the chain.

8. The method of imparting improved heat and light stability to a chlorine-containing polymeric substance which comprises incorporating in said substance a stabilizing amount of a polyvalent metal salt of an aliphatic acid selected from the group consisting of straight chain, branched chain and substituted aliphatic acids of 11 to 22 carbon atoms containing an epoxy ring in the chain.

References Cited in the file of this patent

UNITED STATES PATENTS

| Number | Name | Date |
|---|---|---|
| 2,456,216 | Richter | Dec. 14, 1948 |
| 2,590,059 | Winkler | Mar. 18, 1952 |